United States Patent
Chatterjee et al.

(10) Patent No.: US 7,082,498 B2
(45) Date of Patent: Jul. 25, 2006

(54) ONLINE RAID MIGRATION WITHOUT NON-VOLATILE MEMORY

(75) Inventors: Paresh Chatterjee, Fremont, CA (US); Parag Maharana, Fremont, CA (US); Sumanesh Samanta, Fremont, CA (US)

(73) Assignee: LSI Logic Corporation, Milpitas, CA (US)

( * ) Notice: Subject to any disclaimer, the term of this patent is extended or adjusted under 35 U.S.C. 154(b) by 498 days.

(21) Appl. No.: 10/287,246

(22) Filed: Nov. 4, 2002

(65) Prior Publication Data
US 2004/0088483 A1 May 6, 2004

(51) Int. Cl.
*G06F 12/02* (2006.01)
(52) U.S. Cl. ...................................... 711/114
(58) Field of Classification Search ............... 711/114, 711/161, 162; 710/20, 21
See application file for complete search history.

(56) References Cited

U.S. PATENT DOCUMENTS

| 6,718,435 B1 * | 4/2004 | Riedle ........................ 711/114 |
| 2004/0080558 A1 * | 4/2004 | Blumenau et al. ............ 347/19 |

* cited by examiner

*Primary Examiner*—Donald Sparks
*Assistant Examiner*—Jared Rutz
(74) *Attorney, Agent, or Firm*—Suiter West Swantz PC LLO

(57) ABSTRACT

A method for providing online raid migration without non-volatile memory employs reconstruction of the RAID drives. In this manner, the method of the present invention protects online migration of data from power failure with little or no performance loss so that data can be recovered if power fails while migration is in progress, and migration may be resumed without the use of non-volatile memory.

24 Claims, 3 Drawing Sheets

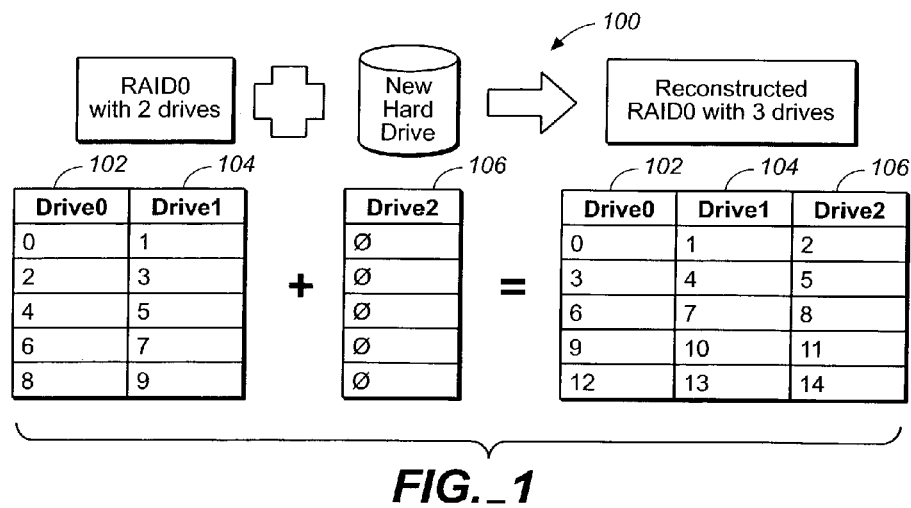
FIG._1
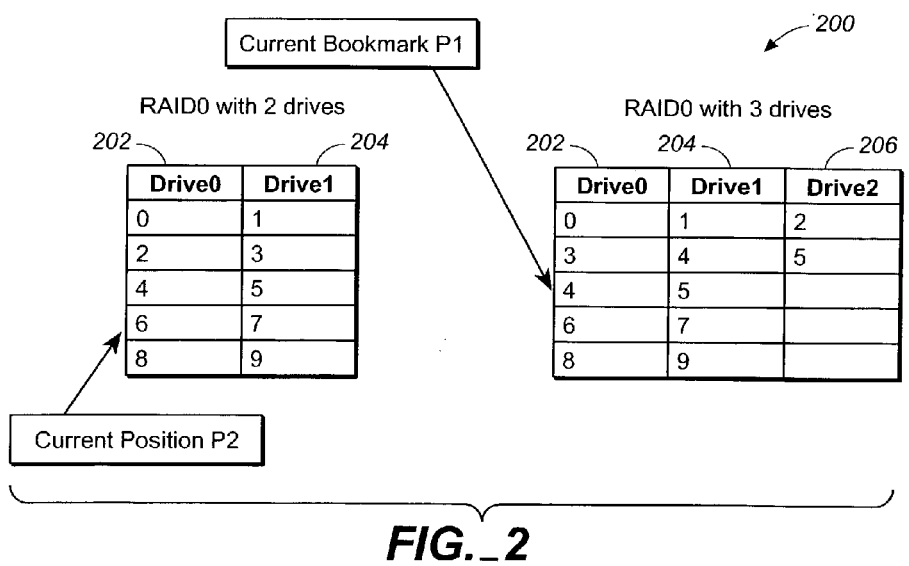
FIG._2

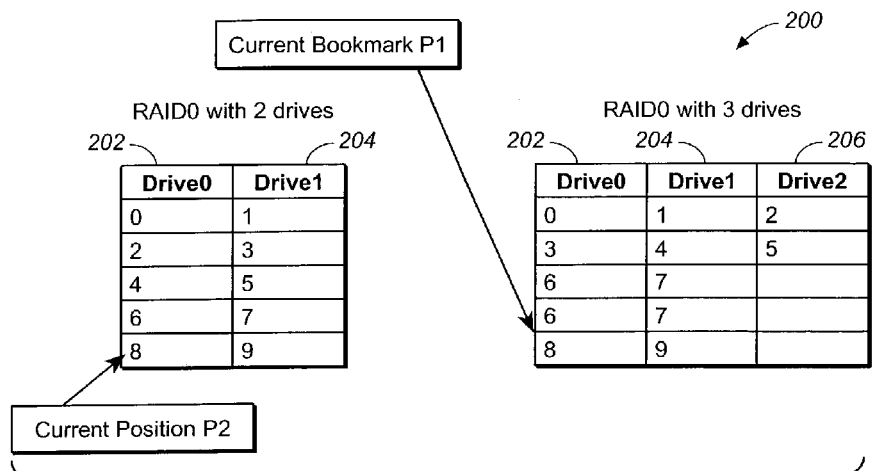
FIG._3
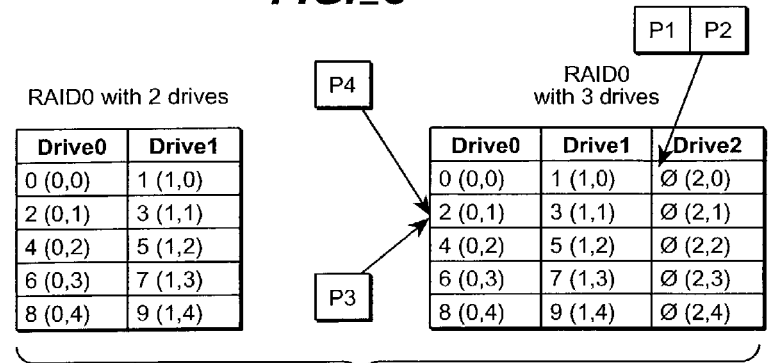
FIG._4
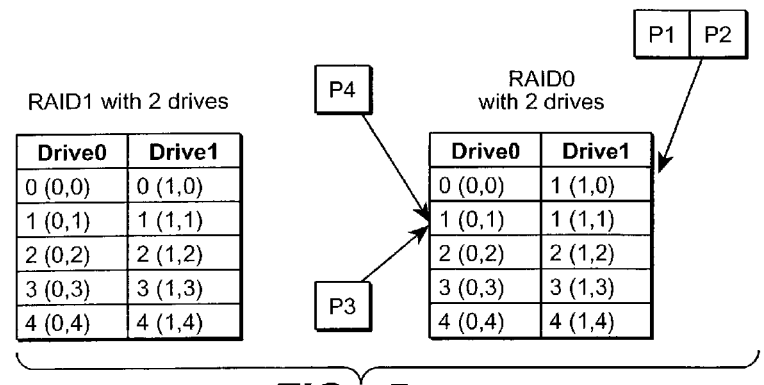
FIG._5

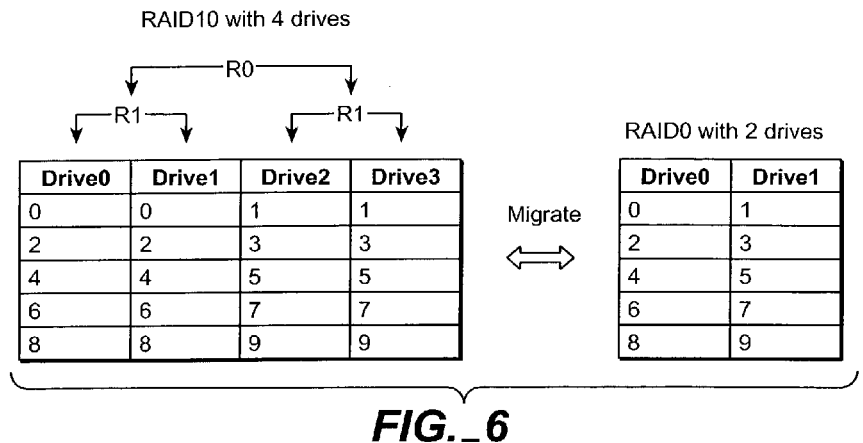
FIG._6
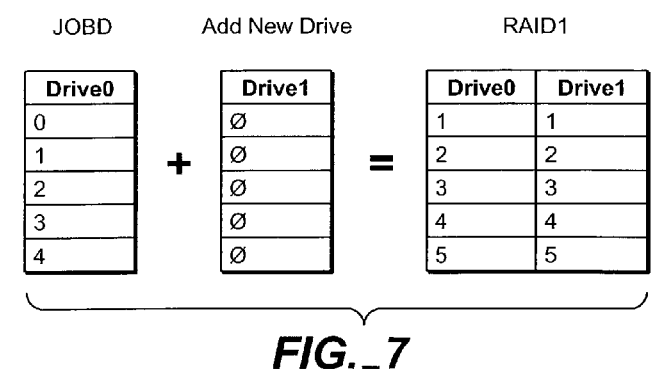
FIG._7

ONLINE RAID MIGRATION WITHOUT NON-VOLATILE MEMORY

FIELD OF THE INVENTION

The present invention generally relates to the field of non-volatile memories, and particularly to a method for providing online raid migration without non-volatile memory.

BACKGROUND OF THE INVENTION

In modern network computer systems, the ever increasing need for data storage space often exceeds the amount of storage initially planned for by designers of the system. One method of meeting the need for added data storage space in systems employing RAID (Redundant Array of Independent Disks) architectures is to provide additional storage devices or hard drives to the system. The addition of new hard drives to existing RAID volumes (logical drives) has the added advantage of providing additional spindles, which in turn increases performance of the data storage system significantly.

To take advantage of a new disk in a RAID volume, the user must migrate (or reconstruct) the new disk using the existing volume (logical drive). However, most RAID systems are deployed in mission critical systems that involve significant cost for shutting down for migration. If power fails while data is migrating the stored data may be corrupted. This problem is efficiently mitigated by hardware based RAID systems, since such systems can keep track of the last block been migrated by using non-volatile memory such as NVRAM (Non-Volatile Random Access Memory), or the like.

In storage systems employing software based RAID with IDE Drives (Parallel & Serial ATA) or SCSI drives, where the driver has no access to private non-volatile memory, safe online migration is more difficult. In the absence of any persistence storage for storing the migration pointer in the event of power failure across system boots, the software/driver runs risk of data corruption. One solution to this problem is to store the migration pointer after every block of migration on a reserved sector in the disk. However, this solution generates an extra write and seek to the reserved sector for every block migrated and, thus, involves a significant performance penalty.

Consequently, it would be desirable to provide a method for providing online raid migration without non-volatile memory. The system and method should protect online migration of data from a failure event such as a power failure, or the like with negligible performance loss. In this manner, data can be recovered if power fails while migration is in progress, and migration resumed without the use of non-volatile memory.

SUMMARY OF THE INVENTION

Accordingly, the present invention is directed to a method for providing online raid migration without non-volatile memory using reconstruction. In exemplary embodiments, the method for migrating data in a RAID system using reconstruction comprises the steps of associating a bookmark with a last sector up to which migration can be completed safely and redirecting input/output operations to safe locations within the RAID based on the at least one bookmark. In this manner, the method of the present invention protects online migration of data from a failure event such as a power failure, or the like with little or no performance loss so that data can be recovered if power fails while migration is in progress, and migration may be resumed without the use of nonvolatile memory.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 1 is a block diagram illustrating migration from RAID0 with two drives to RAID0 with three drives in accordance with an exemplary embodiment of the present invention;

FIGS. 2 and 3 are tabular diagrams illustrating an exemplary migration technique employing reconstruction, wherein migration from RAID0 with 2 drives to RAID0 with three drives is depicted;

FIG. 4 is a tabular diagram illustrating migration of data in accordance with an exemplary embodiment of the present invention, wherein migration from RAID0 with two drives to RAID0 with three drives is depicted;

FIG. 5 is a tabular diagram illustrating migration data in accordance with an exemplary embodiment of the present invention, wherein migration from RAID1 with two drives to RAID0 with two drives is depicted;

FIG. 6 is a tabular diagram illustrating migration data in accordance with an exemplary embodiment of the present invention, wherein migration from RAID10 with four drives to RAID0 with two drives, or alternately, from RAID0 with two drives to RAID10 with four drives is depicted; and FIG. 7 is a tabular diagram illustrating migration of data in accordance with an exemplary embodiment of the present invention, wherein migration from JOBD with one drive to RAID1 with two drives is depicted;

DETAILED DESCRIPTION OF THE INVENTION

Reference will now be made in detail to the presently preferred embodiments of the invention, examples of which are illustrated in the accompanying drawings.

Referring generally now to FIGS. 1 through 7, a method for providing online RAID migration without non-volatile memory is described. RAID systems may be deployed in mission critical systems that involve significant cost for shutting down for migration of data. In the absence of any persistence storage for storing the migration pointer across system boots, the RAID software/driver may cause data corruption in certain situations.

The present invention provides a method for providing online RAID migration without non-volatile memory using reconstruction. The method allows data to be recovered after a failure event, such as a power failure, or the like, that occurs while migration is in progress so that migration may be resumed without the use of non-volatile memory. In this manner, data corruption during online migration of data due to such failure events is prevented, with little or no performance loss.

FIG. 1 illustrates migration of data within a RAID system in accordance with an exemplary embodiment of the present invention. A RAID system 100 having two drives 102 & 104 arranged in a RAID0 architecture having blocks 0 through 9 is provided with an additional drive 106 to increase its capacity. The RAID system 100 is thereafter reconstructed in accordance with the present invention to provide a RAID0 architecture with three drives 102, 104 & 106, having blocks 0 through 14.

In FIG. 1, migration of data from RAID0 with two drives (2 drive RAID0) to RAID0 with three drives (3 drive RAID)) is shown for purposes of illustration. However, it will be appreciated that the method of the present invention may be used during migration between any two RAID levels and with any number of drives without departing from the scope and spirit of the present invention.

FIGS. 2 and 3 illustrate an exemplary reconstruction technique that may be employed by the method of the present invention for migrating data within a software based RAID. Normally, in RAID systems, migration of data is performed with the help of non-volatile persistent memory. In that case, the current migration position is stored in the non-volatile memory after each block migrated. On the event of a power failure, migration can be safely started by reading that persistent memory location. Typically, in software based RAID systems, migration of data is accomplished while the logical drives are inactive or offline. In such migrations, corruption of data is not normally an issue. However, when online migration is performed (i.e., migration of data is accomplished while logical drives are active or online), corruption of data due to input/output operations is possible. Thus, without the help of non-volatile memory (as is the case with Software RAID), the RAID software/driver writes the current position of migration (e.g., the current migration position pointer) in a special block. This writing of the current migration position pointer result in lowered performance of the RAID system during migration. For example, in the embodiment shown in FIG. 2, data in a RAID system 200 initially comprising two drives (Drive0 202 and Drive1 204) having a RAID0 architecture is migrated to three drives (Drive0 202, Drive1 204, and Drive 2 206) also having a RAID0 architecture. All input/output operations (IOs) directed at blocks that are lower than the current migration position of the logical drive (e.g., block N at current migration position P1) are treated as 3 drive RAID0, while those input/output operations directed at blocks that are higher than block N at position P2 are treated as 2 drive RAID0. In FIG. 2, position P1 is pointing to stripe 4 (one block=4·Stripe Size). Any requests above stripe 4 are treated as 3 drive RAID0 and any request on and after Stripe 4 are treated as 2 drive RAID0 at position P2.

If, during the migration of data, the RAID system experiences a failure event such as a power failure, or the like which disrupts the migration, the RAID software must ascertain the correct position to which the migration is performed, when the operating system (OS) is rebooted. Otherwise, the RAID system may experience data corruption.

In one migration technique, a current migration position pointer is saved in a reserved special sector in the disk. If the RAID system experiences a failure event after the RAID software updates the current position but before the start of migration of the next block, then the current migration position will point to the wrong block resulting in possible corruption of the data. For instance, in the exemplary data migration shown in FIG. 3, if the RAID software updates the current migration position P1 to block 7, and, after the update in the current position, the RAID system experiences a power failure, then the current migration position P1 will point to block 7. Consequently, any request for input/output to block 6 and 7 will result in data corruption.

Similarly, if the current migration position is updated after migration of data is complete, corruption of the data is also possible, unless it is ensured that no IO comes to the drives between migrating the data and updating the position. For example, in the data migration shown in FIGS. 2 and 3, if, after data is migrated to reconstructed block 7 and before current migration position P1 can be updated, another input/output command such as a Write IO, or the like, is received modifying the newly reconstructed block (block 7), the RAID system experiences an immediate power failure, the RAID software will follow the current migration position P1 after the RAID system reboots and access block 7, resulting in data corruption This data corruption would not happen if the write IO is held between data migration and updating the position as discussed above. However, holding the write IO in this manner would involve unacceptable performance penalty due to the extra disk write and head movement.

Consequently, using such reconstruction techniques, it has in the past been desirable to update the current migration position at the end of the disk (e.g., in a special sector) to periodically save the current migration position pointer (e.g., after every stripe migrated) in order to limit the possibility of data corruption due to failure events. However, saving the current migration position pointer results in lowered performance, since the RAID software must update the current migration position pointer for every stripe migrated.

Referring now to FIGS. 5 through 7, a method for providing migration of data in accordance with an exemplary embodiment of the present invention is described. The method employs reconstruction techniques, such as the techniques discussed in the description of FIGS. 2 and 3, but modifies those techniques in a novel manner that not result in poor performance. Preferably, the method maintains the integrity of data during migration during and after a failure event such as a power failure or the like by associating a bookmark with the last sector up to which migration can be completed safely. For example, in exemplary embodiments, bookmarks are placed about the last sector up to which migration can be completed safely. In exemplary embodiments, the frequency of placement of the bookmarks varies, being high at the beginning of data migration and decreasing to a minimum limit as the migration progresses. Preferably, the bookmarks are saved in a special reserved sector in the drives involved in the migration. For input/output operations, such as write calls, and the like, are redirected to safe locations within the RAID. In particular, write calls received between the current migration position pointer and the most recent bookmark, both the migrated data and the original data are updated. Preferably, the original data is updated before the migrated data. The present invention thus ensures integrity of the migrated data as long as migration is started from the most recent bookmark after a failure event.

Referring now to FIG. 4, implementation of the method of the present invention is illustrated for migration of data from RAID0 with two drives (2 drive RAID0) to RAID0 with three drives (3 drive RAID0). However, it will be appreciated that the method of the present invention may be extended to other RAID embodiments employing migration with expansion of volume.

As shown in FIG. 4, the method employs four position markers (P1, P2, P3 and P4) instead of the single current position pointer shown in FIGS. 2 and 3. Preferably, each position marker comprises an "Arm Number" and a "Stripe Number" illustrated in FIG. 4 as a ordered pair or tuple. For example, the tuple (0,0) refers to stripe 0 on arm 0 wherein the arm is defined as the drive number. Thus, arm 0 is drive 0, arm 1 is drive 1, and the like. Preferably, these position markers are safely stored in the volatile memory. Thus, updating the position markers has no performance penalty. However, position marker P1 is also stored in a reserved sector of the disk as discussed below.

In accordance with the present invention, the four position markers (P1, P2, P3, and P4) are defined as follows:
P1 is the current safe point (Bookmark).
P2 is the current point to which reconstruction is completed
P3 is the current point from which data is being read for reconstruction, and
P4 is the position of P3 when P1=P2.

Position marker P1 is referenced as the bookmark, and is updated in a special reserved sector of the involved drives whenever the value of P1 changes as per the logic described below.

When reconstruction starts, the position markers are initialized so that P1=P2=P3=P4=(0,0). As reconstruction proceeds, the values of position markers P2 and P3 increase. No actual read/write operation need be performed until the values of position markers P2 and P3 become different. For example, in the 2 drive RAID0 to 3 drive RAID0 embodiment illustrated in FIG. 5, the values of position markers P2 and P3 are equal (P2=P3) until the completion reconstruction of stripes 0 and 1. When the values of position markers P2 and P3 become different, P1 and P4 are updated. Thus, when stripes 0 and 1 are reconstructed, the four position markers (P1, P2, P3, and P4) have the following values:

$P1=(2,0)$ $P2=(2,0)$ $P3=(0,1)$ $P4=(0,1)$

As stripe 2 is reconstructed, the values of position markers P2 and P3 continue to increase, while the values of position markers P1 and P4 remain constant. Position markers P1 and P4 are updated when either the value of position marker P2 becomes equal to the value of position marker P4 or the value of position marker P2 less the value of position marker P1 (P2−P1) exceeds a predetermined "bookmark threshold". The bookmark threshold comprises the maximum amount of migration allowed before generating a new bookmark (i.e., position marker P1). Thus, the bookmark threshold may become increasingly significant during later stages of the reconstruction when the values of P1 and P4 are far apart. Preferably, the bookmark threshold is optimized. Selection of a large bookmark threshold forces a higher number of input/output operations such as write calls to be duplicated, while selection of a small bookmark threshold causes more frequent updates of the bookmark to the disk. In exemplary embodiments of the invention, the values of position markers P1 and P4 are updated so that the value position marker P1 becomes equal to the value of position marker P2 and the value of position marker P4 becomes equal to the value of position marker P3. Position markers P1, P2, P3, and P4 are updated in this manner until reconstruction of the RAID is completed.

In embodiments of the invention, write calls (i.e., writes) and like input/output operations are redirected as follows during reconstruction:

1. Writes to locations falling between stripe 0 on arm 0 (i.e., position (0,0)) and the current safe point indicated by position marker P1 are redirected to the reconstructed part of the RAID logical drive (LD).
2. Writes to locations falling between the current point to which reconstruction is completed as indicated by position marker P3 and the end of the new RAID logical drive (LD) are redirected to the old RAID logical drive (LD).
3. Writes to locations falling between the positions indicated by position markers P4 and P3 are also redirected to locations between the positions indicated by position markers P1 and P2. Preferably, writes to locations falling between positions indicated by position markers P4 and P3 are completed first, followed by writes to locations falling between positions indicated by position markers P1 and P2.

This routing of write calls ensures data integrity in case of a failure event such as a power failure or the like, since, when the RAID system is rebooted, the RAID software/driver can safely begin reconstructing from the last bookmark.

FIG. 5 illustrates application of the method of the present invention to RAID1 to RAID0 migration. Again, the position markers are initialized so that P1=P2=P3=P4=(0,0) at the start of reconstruction. The values of position markers P1 and P4 remain constant, while the values of position markers P2 and P3 are increased as described above. Preferably, the values of position markers P2 and P3 are equal (P2=P3) for the whole of block (0,0) and no write is required. After reconstruction of block (0,0) is completed, the values of position markers P1 and P2 are equal to (1,0) (i.e., P1=P2= (1,0)), while the values of position markers P3 and P4 are equal to (0,1) (i.e., P3=P4=(0,)). Again, the values of position markers P1 and P4 remain constant, while the values of position markers P2 and P3 increase. When the value of position marker P2 becomes equal to (0,1) and thus equal to the value of position marker P4, the values of position markers P1 and P2 are changed to (0,1) (i.e., P1=P2=(0,1)) and the values of position markers P3 and P4 are changed to (0,2) (i.e., P3=P4=(0,2)). Position markers P1, P2, P3, and P4 are updated in this manner until reconstruction of the RAID is completed. Position markers P1, P2, P3, and P4 are updated in this manner until reconstruction of the RAID is completed.

FIG. 6 illustrates application of the method of the present invention to migration from RAID10 with four drives to RAID0 with two drives, or alternately, from RAID0 with two drives to RAID10 with four drives. Similarly, FIG. 7 illustrates application the method of the present invention to migration from a single drive to RAID 1 with two drives. As can be seen from FIGS. 6 and 7, the method applies perfectly and trivially for both RAID0 to RAID10 and Single Drive to RAID1 migration. However, in this embodiment, only two position markers (P1 and P2) are used. These position markers (P1 and P2) are defined as follows:
P1 is the current safe point (bookmark), and
P2 is the current point to which reconstruction is completed.

Preferably, whenever the value of position marker P2 less the value of position marker P1 (P2−P1) exceeds the bookmark threshold, the value of position marker P1 is updated and made equal to the value of position marker P2. Preferably, write calls (i.e., writes) and like input/output operations are redirected as follows during reconstruction:

1. Writes to locations falling between stripe 0 on arm 0 (i.e., position (0,0)) and position marker P2 are redirected to both the original drive and the mirror drive.
2. Writes to locations falling from position marker P2 to the end of the disk are redirected to the original drive.

In the event of a power failure, migration can be safely started from the last saved bookmark.

RAID systems may be deployed in mission critical systems that involve significant cost for shutting down for migration of data. In the absence of any persistence storage for storing the migration pointer across system boots, the RAID software/driver may cause data corruption in certain situations. The present invention allows online migration in software based RAID without interruption of IO to provide larger disk capacity without stopping running applications or tasks. Thus, the present invention helps to ensure continuous availability of data all the time. The method of the present invention may be employed with a wide variety of RAID levels and disk configurations. For example, in the embodiments illustrated, data within a RAID system can be migrated from RAID0 to RAID0 with the addition of a drive (e.g., to increase drive capacity), from RAID0 to RAID10, from RAID10 to RAID0, from RAID1 to RAID0 and standalone single drive JOBD (Just a Bunch of Disks) to RAID1. It will be apparent to those of skill in the art, based on these examples, that the method of the present invention may be used in a variety of other RAID data migrations as well, without departing from the scope and spirit of the invention.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for migrating data in a RAID system using reconstruction, comprising:
    associating a bookmark with a last sector up to which migration can be completed safely; and
    redirecting input/output operations to safe locations within the RAID based on the at least one bookmark;
    wherein the step of associating a bookmark with a last sector up to which migration can be completed safely further comprises using position markers for marking a current safe point, a current point to which reconstruction is completed, a current point from which data is being read for reconstruction, and a position of the current point from which data is being read when the position marker for the current safe point is equal to the position marker for the current point to which reconstruction is completed.

2. The method as claimed in claim 1, wherein the step of associating a bookmark with a last sector up to which migration can be completed safely further comprises placing bookmarks about the sector.

3. The method as claimed in claim 1, wherein the step of redirecting input/output operation to safe locations with the RAID further comprises updating both migrated data and original data for write calls received between a current migration position pointer and the at least one bookmark.

4. The method as claimed in claim 1, wherein the step of associating a bookmark with a last sector up to which migration can be completed safely further comprises using at least two position markers to locate the bookmark.

5. The method as claimed in claim 1, wherein the position marker for the current safe point is referenced as the bookmark.

6. The method as claimed in claim 1, wherein the position markers for the current safe point and the position of the current point from which data is being read when the position marker for the current safe point is equal to the position marker for the current point to which reconstruction is completed are updated when at least one of the value of the position marker for the current point to which reconstruction is completed becomes equal to the value of position marker for the position of the current point from which data is being read when the position marker for the current safe point is equal to the position marker for the current point to which reconstruction is completed and the value of the position marker for current point to which reconstruction is completed less the value of the position marker for the current safe point exceeds a predetermined bookmark threshold.

7. The method as claimed in claim 6, wherein the bookmark threshold comprises a maximum amount of migration allowed before generating a new bookmark.

8. The method as claimed in claim 1, wherein during reconstruction, input/output operations are redirected so that:
    a) writes to locations falling between stripe 0 on arm 0 (position (0,0)) and the current safe point are redirected to the reconstructed part of the RAID logical drive (LD);
    b) writes to locations falling between the current point to which reconstruction is completed and the end of the RAID logical dive (LD) are redirected to the old RAID logical drive (LD); and
    c) writes to locations falling between the position of the current point from which data is being read when the position marker for the current safe point is equal to the position marker for the current point to which reconstruction is completed and the current point from which data is being read for reconstruction are redirected to locations between the current safe point and the current point to which reconstruction is completed.

9. The method as claimed in claim 1, wherein data is migrated from RAID0 with two drives (2 drive RAID0) to RAID0 with three drives (3 drive RAID0).

10. The method as claimed in claim 1, wherein the step of associating a bookmark with a last sector up to which migration can be completed safely further comprises using position markers for marking a current safe point and a current point to which reconstruction is completed.

11. The method as claimed in claim 10, wherein during reconstruction, input/output operations are redirected so that:
    a) writes to locations falling between stripe 0 on arm 0 (position (0,0)) and the current point to which reconstruction is completed are redirected to both the original drive and a mirror drive; and
    b) writes to locations falling between the current point to which reconstruction is completed to the end of the disk are redirected to the original drive.

12. The method as claimed in claim 10, wherein data is migrated from one or RAID0 to RAID10, RAID10 to RAID0, RAID1 to RAID0, and standalone single drive JOBD (Just a Bunch of Disks) to RAID1.

13. A RAID system, comprising:
a first drive having a plurality of blocks; and
a second drive added to the first drive, the second drive having a second plurality of blocks;
wherein migration of data upon adding the second drive to the first drive is accomplished using reconstruction by associating a bookmark with a last sector up to which migration can be completed safely using at least two position markers to locate the bookmark, the at least two position markers for marking a current safe point, a current point to which reconstruction is completed, a current point from which data is being read for reconstruction, and a position of the current point from which data is being read when the position marker for the current safe point is equal to the position marker for the current point to which reconstruction is completed, and redirecting input/output operations to safe locations within the RAID based on the bookmark.

14. The RAID system as claimed in claim 13, wherein associating a bookmark with a last sector up to which migration can be completed safely further comprises placing bookmarks about the sector.

15. The RAID system as claimed in claim 13, wherein redirecting input/output operation to safe locations with the RAID further comprises updating both migrated data and original data for write calls received between a current migration position pointer and the at least one bookmark.

16. The RAID system as claimed in claim 13, wherein the position marker for the current safe point is referenced as the bookmark.

17. The RAID system as claimed in claim 13, wherein the position markers for the current safe point and the position of the current point from which data is being read when the position marker for the current safe point is equal to the position marker for the current point to which reconstruction is completed are updated when at least one of the value of the position marker for the current point to which reconstruction is completed becomes equal to the value of position marker for the position of the current point from which data is being read when the position marker for the current safe point is equal to the position marker for the current point to which reconstruction is completed and the value of the position marker for current point to which reconstruction is completed less the value of the position marker for the current safe point exceeds a predetermined bookmark threshold.

18. The RAID system as claimed in claim 17, wherein the bookmark threshold comprises a maximum amount of migration allowed before generating a new bookmark.

19. The RAID system as claimed in claim 13, wherein during reconstruction, input/output operations are redirected so that:
   d) writes to locations falling between stripe 0 on arm 0 (position (0,0)) and the current safe point are redirected to the reconstructed part of the RAID logical drive (LD);
   e) writes to locations falling between the current point to which reconstruction is completed and the end of the RAID logical dive (LD) are redirected to the old RAID logical drive (LD); and
   f) writes to locations falling between the position of the current point from which data is being read when the position marker for the current safe point is equal to the position marker for the current point to which reconstruction is completed and the current point from which data is being read for reconstruction are redirected to locations between the current safe point and the current point to which reconstruction is completed.

20. The RAID system as claimed in claim 13, wherein data is migrated from RAID0 with two drives (2 drive RAID0) to RAID0 with three drives (3 drive RAID0).

21. The RAID system as claimed in claim 13, wherein the step of associating a bookmark with a last sector up to which migration can be completed safely further comprises using position markers for marking a current safe point and a current point to which reconstruction is completed.

22. The RAID system as claimed in claim 21, wherein during reconstruction, input/output operations are redirected so that:
   c) writes to locations falling between stripe 0 on arm 0 (position (0,0)) and the current point to which reconstruction is completed are redirected to both the original drive and a mirror drive; and
   d) writes to locations falling between the current point to which reconstruction is completed to the end of the disk are redirected to the original drive.

23. The RAID system as claimed in claim 21, wherein data is migrated from one or RAID0 to RAID10, RAID10 to RAID0, RAID1 to RAID0, and standalone single drive JOBD (Just a Bunch of Disks) to RAID1.

24. A RAID system, comprising:
a first drive having a plurality of blocks; and
a second drive added to the first drive, the second drive having a second plurality of blocks;
wherein migration of data upon adding the second drive to the first drive is accomplished using reconstruction by associating a bookmark with a last sector up to which migration can be completed safely using position markers for marking a current safe point, a current point to which reconstruction is completed, a current point from which data is being read for reconstruction, and a position of the current point from which data is being read when the position marker for the current safe point is equal to the position marker for the current point to which reconstruction is completed to locate the bookmark, and redirecting input/output operations to safe locations within the RAID based on the bookmark by updating both migrated data and original data for write calls received between a current migration position pointer and the at least one bookmark.

* * * * *